Feb. 25, 1958  J. M. PETERS  2,824,744
FLEXIBLE COLLET AND CHUCK EMPLOYING SAME
Filed March 9, 1956  3 Sheets-Sheet 1

INVENTOR.
JOSEPH M. PETERS
BY
Richard W. Treverton
ATTORNEY

Feb. 25, 1958 J. M. PETERS 2,824,744
FLEXIBLE COLLET AND CHUCK EMPLOYING SAME
Filed March 9, 1956 3 Sheets-Sheet 3
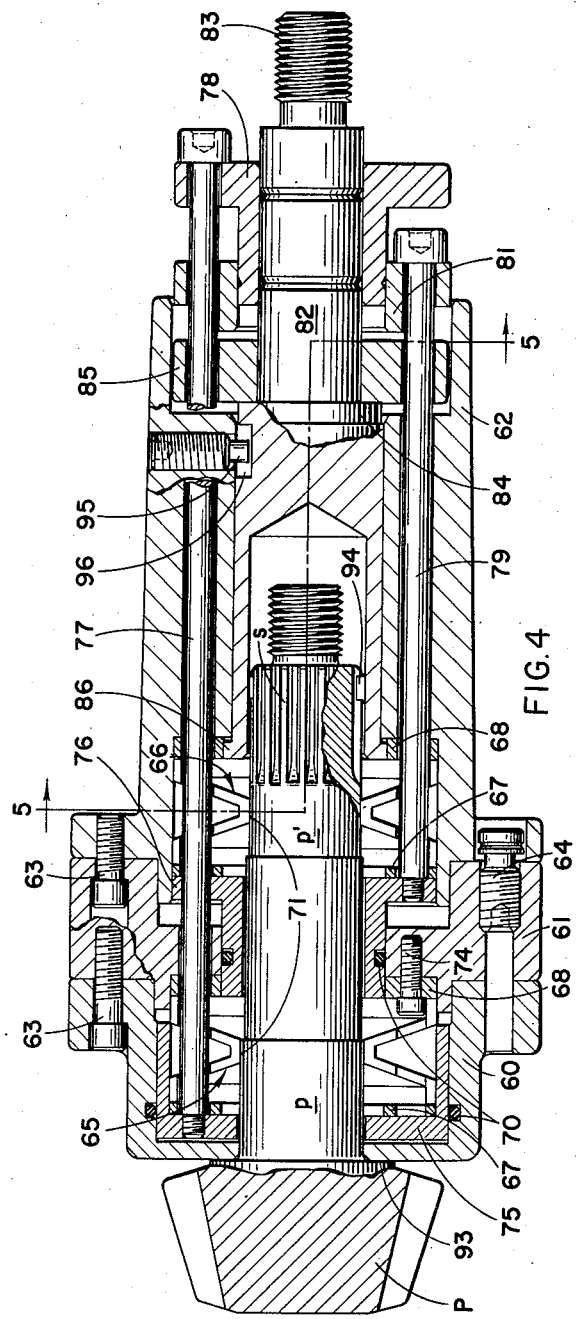
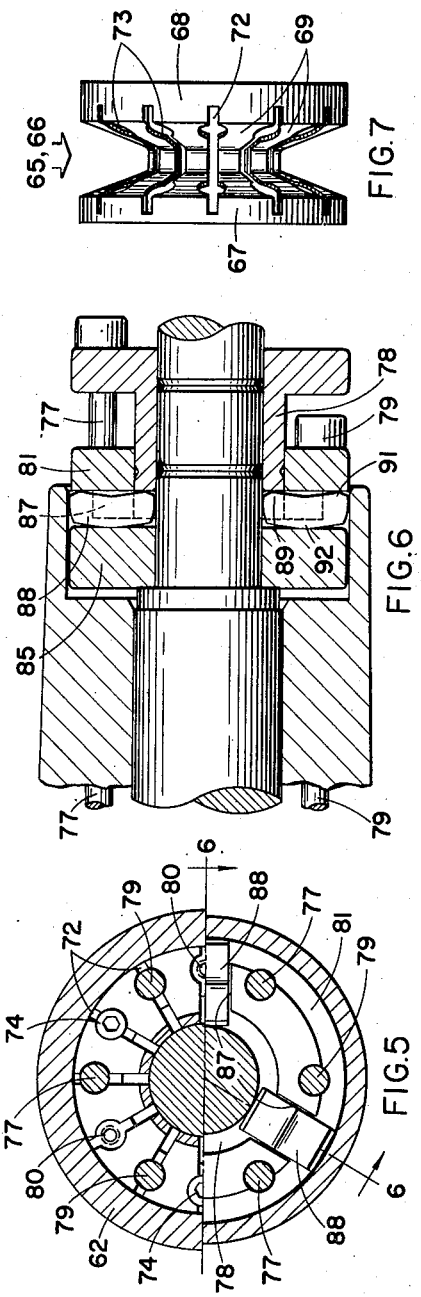

United States Patent Office 2,824,744
Patented Feb. 25, 1958

2,824,744

FLEXIBLE COLLET AND CHUCK EMPLOYING SAME

Joseph M. Peters, Rochester, N. Y., assignor to The Gleason Works, Rochester, N. Y., a corporation of New York Application March 9, 1956, Serial No. 570,457

12 Claims. (Cl. 279—2)

The present invention relates to annular collets for chucks and other clamping devices and to chucks and the like employing such collets.

A collet according to the invention comprises a pair of axially spaced rims and an integral and relatively flexible connecting section which is of truncated V-shape in axial section and has a plurality of circumferentially spaced and at least approximately radial slots therethrough. The arrangement is such that upon axial compression of the collet the central zone of the connecting section is displaced radially to grip the part that is to be clamped. The gripping surface of this central zone may be of either external or internal cylindrical shape.

A chuck or other clamping device employing such a collet may comprise a body adapted to be mounted on a machine spindle or the like and having a seat for engaging a rear face of the part to be clamped, one rim of the collet being connected to the body and the other rim being connected to a member which is movable relative to the body for moving said other rim toward said one rim, to thereby compress the collet axially and cause the central zone of the connecting section to grip the part.

Typical preferred embodiments of the invention are shown in the accompanying drawings, wherein:

Fig. 4 is an axial-plane sectional view through a chuck for an automotive axle drive pinion;

Fig. 5 is a cross-section taken in the two planes indicated by section line 5—5 in Fig. 4;

Fig. 6 is an axial-plane sectional view in the planes designated 6—6 in Fig. 5; and, Fig. 7 is a side elevation of the collet shown in Figs. 4 and 5.

Figure 1:
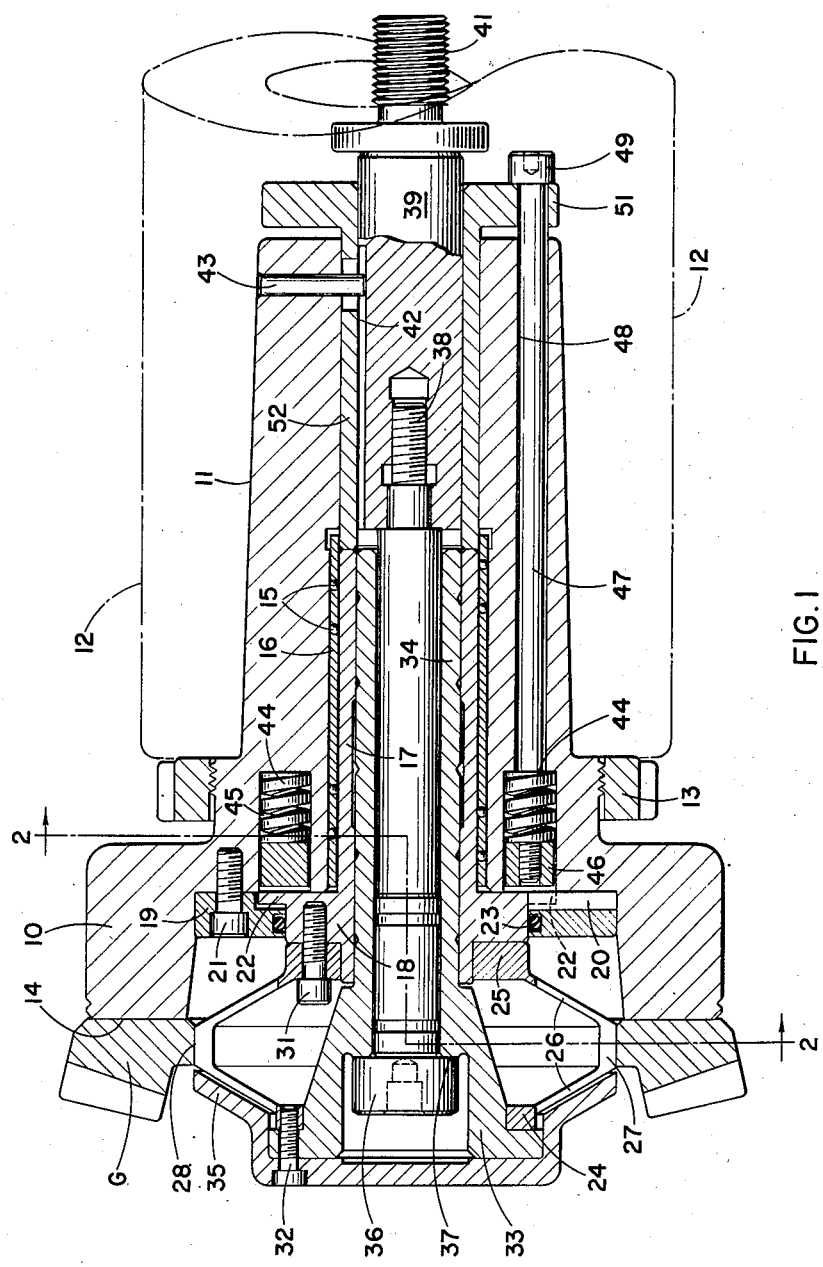
Fig. 1 is an axial-plane section through a chuck for an automotive axle ring gear.
Figure 2:
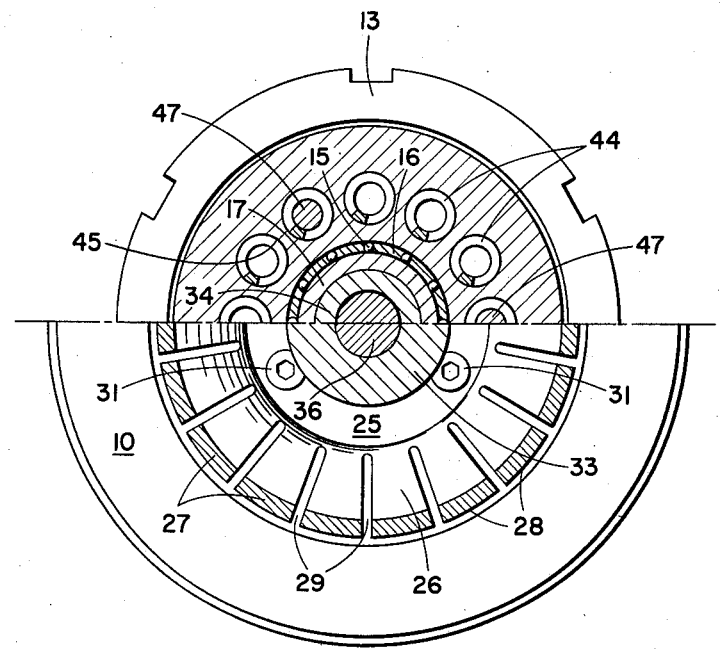
Fig. 2 is a cross-sectional view taken in the two planes indicated by section line 2—2 in Fig. 1.
Figure 3:
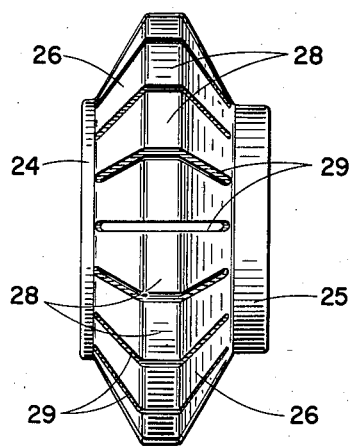
Fig. 3 is a side elevation of the collet appearing in Figs. 1 and 2.

The chuck shown in Figs. 1, 2 and 3 comprises a body 10 having a tapered portion 11 adapted to engage with a wedge fit in the tapered bore of a machine spindle, in this case the spindle 12, shown in phantom lines, of a bevel gear lapping machine. For the purpose of removing the chuck from the spindle a jack nut 13 is screw threaded to body 10. The body has a plane front face 14 constituting a seat for the back face of the part to be clamped which in this case is bevel ring gear G.

A linear ball bearing comprising a plurality of balls 15 and a ball-retainer sleeve 16 is arranged in a bore in the body and supports the rearwardly-extending tubular stem 17 of a collet centering member 18. The linear motion of the collet centering member relative to body 10 is limited by stop means comprising a ring 19 secured to the body by screws 21, the ring and body confining a peripheral flange 22 of the centering member. The ring also supports a flexible O-ring seal 23 whose function is to exclude abrasive particles and other unwanted matter from the area of bearing 15, 16. A key 20 engaging in keyways in flange 22 and ring 19 serves to hold the collet centering member against rotation relative to the body 10.

The annular collet has relatively rigid front and rear rims, 24 and 25, integrally connected by a flexible section 26 which in the axial-plane section, Fig. 1, is of truncated V-shape. The central zone 27 of the flexible section has a cylindrical external surface 28 which, in the normal unflexed condition of the collet has an easy sliding fit with the central bore of the gear G. The section 26 of the collet, and especially the zones thereof on either side of the central zone 27, is rendered flexible by the inherent resilience of the material (preferably tempered steel) of which it is formed, by the relative thinness of its section, and by a plurality of circumferentially spaced radial slots 29 which extend through it. These slots of course interrupt the continuity of the cylindrical surface 28. This central zone 27 may be either of the same or different wall thickness than the zones on either side of it, but, as shown in Fig. 1, it is preferably of somewhat greater wall thickness and hence more rigid.

The rim 25 is secured to centering member 18, 17 by screws 31, while the rim 24 is secured by screws 32 to a collet clamp member 33 which has a rearwardly extending tubular stem 34 telescoping within the member 18, 17. The screws 32 also secure to the parts 24, 33 a dished-shaped guard plate 35 which protects the collet and also serves as a pilot to guide the gear G into place on the chuck.

For the purpose of drawing the clamp member 33 rearwardly, or to the right in Fig. 1, for compressing the collet axially, a draw bolt 36 is provided. The head of this bolt provides a shoulder adapted for abutment with a forward surface 37 of the member 33. The draw bolt has screw-threaded joint 38 with a connector 39 which in turn is screw-threaded, at 41, for connection to a draw bar that may extend, for example, to a fluid pressure operated draw bar actuator (not shown) on the opposite end of the spindle 12. The connector has a keyway 42 engaged by a key 43 to hold the connector against unintentional rotation relative to the body.

For the purpose of constantly urging the collet centering member to its forward limit position determined by stop ring 19, a plurality of coiled compression springs 44 are provided. These springs, disposed in pockets 45 in the body 10, act between the latter and a ring 46 to which a plurality of rods 47 are connected by being screw threaded thereto. These rods extend through openings 48 in the body 10 and through aligned openings in flange 51 of a sleeve 52, the rods having heads 49 at their ends which abut the rear face of the flange. The sleeve 52 is slidable axially in the body 10, is of the same diameter as the tubular stem 17 of collet centering member 18, and is held in abutment with the latter by the springs 44 which constantly urge the assembly 46, 47, 52 forwardly, to the left in Fig. 1.

In Fig. 1 the chuck is shown in its operative position in which the connector 39 has been moved as far rearwardly (to the right) as possible. In this position the collet has been compressed axially, which has caused the cylindrical surface 28 to firmly grip the bore of gear G. To effect release, the connector is moved forwardly until the head of bolt 36 is spaced from face 37 of the clamp member. As this motion proceeds, the springs 44 act through the assembly 46, 47, 52 to move the collet centering member 18, and also the collet and gear G, forwardly to the limit position determined by stop ring 19; and the inherent resilience of the collet causes it to expand axially and contract radially to its normal unflexed condition in which cylindrical surface 28 releases the gear. Hence the latter may be removed and replaced by a fresh gear G.

Chucking is effected by drawing the connector rearwardly. As this motion proceeds, the resistance imposed by springs 44 to rearward motion of the collet rim 25 results in the clamp member 33, which is being moved to the right in Fig. 1 by headed bolt 36, compressing the collet axially until surface 28 firmly grips the gear. Continued rearward motion causes the collet, the gear, and the collet centering member 18, to move rearwardly as a unit until the rear face of the gear is tightly clamped against seat 14 of the chuck body. In this action some slight sliding of the surface 28 in the bore of the gear may take place. In any case, at the conclusion of the motion, both the bore and back face of the gear are firmly clamped respectively to the collet and to the seat 14. During the chucking operation, the effect of the assembly 46, 47, 52, which applies pressure against the rear face of the relatively long tubular stem 17, is to equalize any inequality that may exist in the pressures exerted by the several springs 44, thereby preventing improper seating of the gear on surface 14 from this cause.

The chuck shown in Figs. 4 to 7, inclusive, comprises a body having a nose section 60, intermediate section 61, and tail section 62, fastened together by screws 63. The tail section is tapered to fit a similarly tapered bore of a machine spindle, not shown. Circumferentially spaced about the body are a plurality of jack screws 64 for loosening the chuck from the spindle. Arranged in tandem within the chuck body are two generally similar collets 65 and 66, each having front and rear rims 67 and 68, and an integral relatively flexible connecting section 69 of substantially truncated V-shape in axial section. The central zone of the connecting section presents an internal cylindrical surface 71 to the part to be clamped, which in this case is bevel pinion P whose shank has cylindrical surfaces $p$ and $p'$ to be gripped respectively by the front and rear collets 65 and 66, and a splined section $s$. The connecting sections 69 of the collets have circumferentially spaced radial slots 72 to increase their flexibility. The slots are widened to provide circular openings 73, for purposes which will be described.

The rear rims of the collets 65 and 66 are secured respectively to body sections 61 and 62 by screws 74, wrench access to the screws being had through certain ones of the openings 73. In front of the front flanges of the two collets are clamp rings 75 and 76 which are slidable respectively in bores in body sections 60 and 62. Secured by screw-threading to ring 75 are a plurality of headed rods 77 which extend through certain openings 73 of both collets and aligned openings in the body sections 61 and 62 and in the flange of a rocker bearing ring 78 that is disposed at the rear of the chuck. Similarly, secured to ring 76 are a plurality of headed rods 79 which extend through other openings 73 of rear collet 66 and through aligned openings in section 62 and in the flange of another rocker bearing ring 81 at the rear of the chuck. The heads of the rods abut the rear surfaces of these flanges. As shown, the rings 78 and 81 are concentric, and are adapted for sliding motion relative to each other and to a connector 82 which extends through ring 78 and is also slidable within body section 62. The connector is screw-threaded at 83 for attachment to a draw rod (not shown) which may extend to a suitable chuck actuating device, which may comprise a fluid pressure operated cylinder-piston unit mounted on the end of the machine spindle opposite to the chuck. A flange 84 on the connector abuts the front face of a rocker fulcrum ring 85 and another flange thereon, designated 86, is adapted to abut a forward surface of chuck body 62 to limit rearward motion of the connector in case the chuck is operated without a pinion first being inserted therein.

The forward portion of ring 81 has a plurality of equispaced radial slots 87 in each of which a rocker 88 is disposed. Each rocker has an inner end bearing portion 89 abutting a forward face of ring 78, an outer end bearing portion 91 abutting a front face of ring 81, and an intermediate fulcrum bearing portion 92 abutting the rear face of fulcrum ring 85. The rockers serve to divide between the two collets 65 and 66 the rearwardly directed pressure which is applied through the connector 82. That is, as the connector is drawn rearwardly, and with it the fulcrum ring 85 and rockers 88, the latter press against the rings 78 and 81 to urge them rearwardly also (and with them the rods 77, 79 and collet clamp rings 75, 76), but the rockers are free to rock on the fulcrum ring to thereby divide such pressure between the two rings 78 and 81. Accordingly if there is a slightly undersize or oversize condition of one of sections $p$ or $p'$ of the pinion P which requires one collet to contact more or less than the other in gripping the workpiece, the rockers accommodate the resulting difference in the required amounts of axial motion of the two clamp rings 75 and 76.

O-ring seals 70 are provided between the body sections 60, 61 and the front and rear clamp rings 75, 76, to protect their sliding surfaces. To facilitate removal of the collets from the body sections 61 and 62 for cleaning or replacement, the rear rims of the collets are provided with threaded openings, 80, Fig. 5, into which jack screws may be inserted.

It will be understood that as the chuck is applied, i. e. as the clamp rings 75, 76 are moved rearwardly to compress the collets axially so that surfaces 71 will contract to grip the pinion P, these surfaces 71 will also have a small rearward motion which will serve to draw the rear face of the pinion head tightly against seat 93 on the chuck body nose section 60. To assure that the pinion will not turn in the chuck, the connector 82 preferably has internal splines 94 engaging the external splines $s$ of the pinion; and a key 95 in the rear body section 62 engages in a keyway 96 in the connector. The key also limits forward motion of the connector so that flange 86 thereof cannot strike the rear collet 66. It will be understood that upon forward motion of the connector the collets by their inherent resiliency will expand axially, and the surfaces 71 thereof will expand radially, to their normal condition, thereby releasing their grip on the pinion.

Having now described typical preferred embodiments of the invention, what is claimed is:

1. A chuck or other clamping device comprising a body adapted to be mounted on a machine spindle or the like and having a seat for engaging a back face of a part to be clamped, an annular collet for engaging a cylindrical surface of the part engaged with said seat, said collet having front and rear rims of which one is connected to the chuck body and a relatively flexible connecting section which is of truncated V-shape in axial section and has a cylindrical surface for engaging said cylindrical surface of the part, and actuating means for moving the other one of said rims axially toward said one of said rims to thereby compress the collet axially and cause said cylindrical surface thereof to grip the cylindrical surface of the part.

2. A chuck or the like according to claim 1 in which said connecting section is integral with said rims and has a plurality of circumferentially spaced and at least approximately radial slots therethrough.

3. A chuck or the like according to claim 1 in which the connecting section of the collet has a central zone having a substantially cylindrical external gripping surface, there are a collet centering member secured to the rear rim and a collet clamping member secured to the front rim, said centering member being supported for limited axial motion within the body, resilient means for urging said centering member to its forward limit position, and the means for moving the other one of said rims axially comprises a means to move said clamping member rearwardly with respect to said body.

4. A chuck or the like according to claim 3 in which the collet centering member and the collet clamping member have rearwardly extending telescoping tubular stems telescoped within the body.

5. A chuck or the like according to claim 3 in which said resilient means comprises a sleeve slidable in the rear portion of the body and abutting a rear face of the collet centering member, a ring adjacent the front of the body, a plurality of rods extending through the body and connecting the ring to the sleeve, and a plurality of springs acting in compression between the body and the ring.

6. A chuck or the like according to claim 1 in which there are two collets as there defined, said collets being arranged in tandem and each having its rear rim secured to the body, and said actuating means comprises a draw member movable axially with respect to the body and a load-dividing means for transmitting rearwardly directed pressure from the draw member to the front rims of the two collets.

7. A chuck or the like according to claim 6 in which said load-dividing means comprises a clamp ring in front of each collet, concentric outer and inner rocker bearing rings at the rear of the body, a plurality of rods connecting the clamp rings respectively to the rocker bearing rings, a plurality of circumferentially arranged and radially disposed pressure-dividing rockers having their outer and inner ends respectively engaging the outer and inner rocker bearing rings, and a fulcrum bearing member engaging a fulcrum portion of each rocker, said fulcrum bearing member being movable rearwardly and forwardly with respect to the body for respectively compressing and releasing said collets.

8. A chuck or the like comprising a body adapted to be mounted on a machine spindle and having a seat for engaging a back face of a workpiece; an annular collet for engaging an interior cylindrical surface of a workpiece engaged with said seat, said collet having integral front and rear rims and a relatively flexible and slotted connecting section which is of truncated V-shape in axial section and has a central zone having a cylindrical external surface for engaging said cylindrical surface of the workpiece; a collet centering member secured to the rear rim and a collet clamping member secured to the front rim, said members having rearwardly extending telescoping tubular stems telescoped within the body; a linear ball bearing supporting the stem of the collet centering member for axial motion in the body; stop means for limiting such motion; means for urging the collet centering member toward its forward limit position comprising a sleeve slidable in the body and abutting a rear face of the collet centering member, a ring adjacent the front of the body, a plurality of rods extending through openings in the body and connecting the ring to the rear part of the sleeve, and a plurality of compression springs acting between the body and the ring; and a draw bolt extending within said stems and having a shoulder engageable with the collet clamping member for drawing the latter rearwardly to compress the collet axially and thereby expand it radially.

9. A chuck or the like comprising a body adapted to be mounted on a machine spindle and having a seat for engaging a back face of a workpiece; a pair of annular collets arranged in tandem for engaging exterior cylindrical surface portions of a workpiece engaged with said seat, each collet having integral front and rear rims and a relatively flexible and slotted connecting section which is of truncated V-shape in axial section and has a central zone having a substantially cylindrical internal surface for engaging the workpiece, the end zones of the connecting section of each collet having a plurality of rod-passing openings therethrough; a clamp ring in front of each collet; concentric outer and inner rocker bearing rings at the rear of the body; a plurality of rods for each clamp ring connecting it to one of said bearing rings, said rods extending through said rod-passing openings and through the body; a plurality of circumferentially arranged radially disposed load-dividing rockers having their outer and inner ends respectively engaging the outer and inner rocker bearing rings; and a fulcrum bearing member engaging a fulcrum portion of each rocker, said fulcrum bearing member being movable rearwardly and forwardly with respect to the body for respectively compressing and releasing said collets.

10. An annular collet for a chuck or other clamping device comprising a pair of axially spaced rims and an integral and relatively flexible connecting section which is of truncated V-shape in axial section and has a plurality of circumferentially spaced and at least approximately radial slots therethrough, the central zone of said V-shaped flexible connecting section having a cylindrical surface which upon axial compression of the collet is deflected radially to thereby grip the part to be clamped.

11. A collet according to claim 10 in which the central zone of said connecting section is of greater diameter than the end portions thereof and has an external cylindrical surface for gripping the part to be chucked or clamped, said central zone being adapted to expand in diameter upon axial compression of the collet.

12. A collet according to claim 11 in which the central zone of said connecting section is of smaller diameter than the end portions thereof and has an internal cylindrical surface for gripping the part to be chucked or clamped, said central zone being adapted to contract in diameter upon axial compression of the collet.

References Cited in the file of this patent

UNITED STATES PATENTS 1,846,695   Smith _____ Feb. 23, 1932

FOREIGN PATENTS 582,377   Great Britain _____ Nov. 13, 1946